United States Patent
Parisis

(10) Patent No.: US 11,216,865 B2
(45) Date of Patent: Jan. 4, 2022

(54) SYSTEMS AND METHODS FOR CONSUMER-ORIENTED BEHAVIOR PREDICTIONS AND NOTIFICATIONS

(71) Applicant: Christos Parisis, San Carlos, CA (US)

(72) Inventor: Christos Parisis, San Carlos, CA (US)

(*) Notice: Subject to any disclaimer, the term of this patent is extended or adjusted under 35 U.S.C. 154(b) by 0 days.

(21) Appl. No.: 16/370,568

(22) Filed: Mar. 29, 2019

(65) Prior Publication Data

US 2019/0304007 A1    Oct. 3, 2019

Related U.S. Application Data

(60) Provisional application No. 62/650,205, filed on Mar. 29, 2018.

(51) Int. Cl.
```
G06Q 30/06     (2012.01)
H04W 4/23      (2018.01)
H04W 4/024     (2018.01)
H04W 4/33      (2018.01)
H04W 4/021     (2018.01)
```

(52) U.S. Cl.
CPC ..... *G06Q 30/0639* (2013.01); *G06Q 30/0633* (2013.01); *G06Q 30/0641* (2013.01); *H04W 4/022* (2013.01); *H04W 4/024* (2018.02); *H04W 4/23* (2018.02); *H04W 4/33* (2018.02)

(58) Field of Classification Search
CPC ..... G06Q 30/0601–0645; G06Q 30/80; G06Q 30/06–08; G06G 30/06–30/08
USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64, 705/26.7, 26.8, 26.81, 26.82, 26.9, 27.1, 705/27.2

See application file for complete search history.

(56) References Cited

U.S. PATENT DOCUMENTS

| | | |
|---|---|---|
| 8,600,837 B2 | 12/2013 | King et al. |
| 8,612,288 B2 | 12/2013 | King |
| 9,558,507 B2 | 1/2017 | Zilkha |
| 9,595,049 B2 | 3/2017 | Showers et al. |
| 9,626,688 B2 | 4/2017 | King |
| 9,639,853 B2 | 5/2017 | Shiffert et al. |
| 9,679,296 B2 | 6/2017 | Lemphers et al. |
| 9,684,826 B2 | 6/2017 | Dubuque |
| 9,842,253 B2 | 12/2017 | Dubuque |
| 9,881,315 B2 | 1/2018 | Shiffert et al. |
| 9,953,335 B2 | 4/2018 | Shiffert et al. |
| 9,965,769 B1 | 5/2018 | Shiffert et al. |
| 9,978,078 B2 | 5/2018 | Georgoff et al. |
| 10,074,101 B2 | 9/2018 | Zilkha |

(Continued)

*Primary Examiner* — Ming Shui
(74) *Attorney, Agent, or Firm* — Concept IP LLP; Michael Zarrabian

(57) ABSTRACT

Systems, devices, and methods for storing one or more shopping items from a user in a user item database; determining a location of the user using a processor that tracks a geographical location of one or more devices associated with the user; determining a location of one or more stores associated with a stored shopping item using the processor that searches one or more store databases; providing, via a graphical user interface (GUI), a prompt to the user when the determined location of the user is within a pre-determined proximity; and providing, via the GUI, one or more navigation instructions from the determined location of the user to the determined location of the store when the prompt is accepted.

17 Claims, 12 Drawing Sheets

(56) References Cited

U.S. PATENT DOCUMENTS

| | | |
|---|---|---|
| 10,078,830 B2 | 9/2018 | Dragushan et al. |
| 10,229,434 B2 | 3/2019 | Cheng et al. |
| 10,290,015 B2 | 5/2019 | King |
| 10,296,931 B2 | 5/2019 | King |
| 10,304,074 B2 | 5/2019 | Shiffert et al. |
| 10,318,992 B2 | 6/2019 | Showers et al. |
| 10,346,867 B2 | 7/2019 | Faith et al. |
| 2002/0190124 A1* | 12/2002 | Piotrowski ............... G07C 9/37 235/382 |
| 2005/0252965 A1* | 11/2005 | Ohwa ................ G06F 16/9537 235/383 |
| 2009/0055353 A1* | 2/2009 | Meema ................... H04L 12/10 |
| 2013/0332253 A1 | 12/2013 | Shiffert et al. |
| 2013/0332258 A1 | 12/2013 | Shiffert et al. |
| 2013/0332283 A1 | 12/2013 | Faith et al. |
| 2014/0039994 A1 | 2/2014 | King et al. |
| 2014/0067455 A1* | 3/2014 | Zhang .................. G06Q 10/109 705/7.24 |
| 2014/0074579 A1 | 3/2014 | King |
| 2014/0180817 A1 | 6/2014 | Zilkha |
| 2014/0207570 A1* | 7/2014 | Cancro ............. G06Q 30/0631 705/14.53 |
| 2014/0278880 A1 | 9/2014 | Lemphers et al. |
| 2014/0278948 A1 | 9/2014 | Lemphers et al. |
| 2014/0278950 A1 | 9/2014 | Lemphers et al. |
| 2014/0324627 A1* | 10/2014 | Haver ................ G06Q 30/0273 705/26.9 |
| 2015/0254704 A1 | 9/2015 | Kothe et al. |
| 2015/0317708 A1* | 11/2015 | Eramian ............ G06Q 30/0633 705/26.8 |
| 2017/0372362 A1* | 12/2017 | Gavriliu ............. G06Q 30/0275 |
| 2018/0261223 A1* | 9/2018 | Jain .................... G06Q 30/0601 |

\* cited by examiner

SYSTEMS AND METHODS FOR CONSUMER-ORIENTED BEHAVIOR PREDICTIONS AND NOTIFICATIONS

CROSS-REFERENCE TO RELATED APPLICATIONS

This application claims priority to U.S. Provisional Patent Application No. 62/650,205 filed Mar. 29, 2018, the contents of which are hereby incorporated by reference herein for all purposes.

FIELD OF ENDEAVOR

The present embodiments relate generally to digital advertising, and more particularly to generating consumer-oriented advertising notifications.

BACKGROUND

People have devised numerous ways to remind themselves of certain tasks or events. Many people write on physical media, such as sticky notes and calendars. With the ubiquity of electronic devices, many people have turned to computers to help manage their to-do lists and keep of record of upcoming events. Numerous reminder and to-do applications are available, both for desktop computers as well as handheld devices, such as laptop computers, tablet computers, and smartphones.

Likewise, retailers and other goods and services providers have sought ways to target their advertising in order more efficiently use their advertising budgeting dollars. The presence of the internet and online functionalities like cookies and data gathering have allowed product sellers to better target their ideal markets.

SUMMARY

A method embodiment may include: storing one or more shopping items from a user of one or more users in a user item database, where the user item database may be associated with the user of one or more users; determining a location of the user corresponding to the user item database using a processor that tracks a geographical location of one or more devices associated with the user; determining a location of one or more stores associated with a stored shopping item of the one or more shopping items using the processor that searches one or more store databases, where each store database may include a geographical location of each shopping item; providing, via a graphical user interface (GUI), a prompt to the user when the determined location of the user is within a pre-determined proximity to the determined location of a store of the one or more stores associated with the stored shopping item; and providing, via the GUI, one or more navigation instructions from the determined location of the user to the determined location of the store associated with the stored shopping item when the prompt is accepted.

Additional method embodiments may include: marking the stored shopping item as purchased in the user item database. In additional method embodiments, a shopping item of the one or more shopping items may be stored based on one or more previously stored shopping items marked as purchased. In additional method embodiments, a shopping item of the one or more shopping items may be stored via the GUI. In additional method embodiments, each store database may further include a price of each shopping item.

Additional method embodiments may include: providing, via the GUI, one or more navigation instructions inside the store associated with the stored shopping item to the stored shopping item when the prompt is accepted. Additional method embodiments may include: assigning a priority level to the stored one or more shopping items, where the assigned priority level may adjust the pre-determined proximity. Additional method embodiments may include: setting, via the GUI, the pre-determined proximity, where the set pre-determined proximity may be at least one of: a distance from the geographical location of one or more devices associated with the user and a time from the geographical location of one or more devices associated with the user.

In additional method embodiments, the stored shopping item may be a physical item available at the store of the one or more stores associated with the stored shopping item. In additional method embodiments, the stored shopping item may be an item available to order at the store of the one or more stores associated with the stored shopping item. Additional method embodiments may include: removing one or more shopping items from the user of one or more users in the user item database. Additional method embodiments may include: providing, via the GUI, one or more offers for the stored shopping item when the prompt is accepted. In additional method embodiments, providing one or more offers may further include: filtering the one or more offers down to a pre-determined number of offers. Additional method embodiments may include: receiving one or more voice commands from a voice module; and parsing, via a machine learning module, the received one or more voice commands to one or more shopping items to be stored in the user item database.

A system embodiment may include: a user item database, where the user item database may be associated with a user of one or more users, and where one or more shopping items from the user of one or more users may be stored in the user item database; one or more store databases, where each store database may include a geographical location of each shopping item; a processor having addressable memory, the processor configured to: determine a location of the user corresponding to the user item database by tracking a geographical location of one or more devices associated with the user; determine a location of one or more stores associated with a stored shopping item of the one or more shopping items by searching the one or more store databases; provide, via a graphical user interface (GUI), a prompt to the user when the determined location of the user is within a pre-determined proximity to the determined location of a store of the one or more stores associated with the stored shopping item; and provide, via the GUI, one or more navigation instructions from the determined location of the user to the determined location of the store associated with the stored shopping item when the prompt is accepted.

In additional system embodiments, a shopping item of the one or more shopping items may be stored based on at least one of: one or more previously stored shopping items marked as purchased and via the GUI. In additional system embodiments, the processor may be further configured to: provide, via the GUI, one or more navigation instructions inside the store associated with the stored shopping item to the stored shopping item when the prompt is accepted. In additional system embodiments, the stored shopping item may be at least one of: a physical item available at the store of the one or more stores associated with the stored shopping item and an item available to order at the store of the one or more stores associated with the stored shopping item. In additional system embodiments, the processor may be further configured to: provide, via the GUI, one or more offers for the stored shopping item when the prompt is accepted; and filter the one or more offers down to a pre-determined number of offers.

Another system embodiment may include: a processor having addressable memory, the processor configured to: store one or more shopping items from a user of one or more users in a user item database, where the user item database may be associated with the user of one or more users; determine a location of the user corresponding to a user item database by tracking a geographical location of one or more devices associated with the user; determine a location of one or more stores associated with a stored shopping item of the one or more shopping items by searching the one or more store databases, where each store database comprises a geographical location of each shopping item; provide, via a graphical user interface (GUI), a prompt to the user when the determined location of the user is within a pre-determined proximity to the determined location of a store of the one or more stores associated with the stored shopping item; and provide, via the GUI, one or more offers for the stored shopping item when the prompt is accepted, where the one or more offers may be filtered down to a pre-determined number of offers; provide, via the GUI, one or more navigation instructions from the determined location of the user to the determined location of the store associated with the stored shopping item when the prompt is accepted; provide, via the GUI, one or more navigation instructions inside the store associated with the stored shopping item to the stored shopping item; mark the stored shopping item as purchased in the user item database; and store the purchased item in the user item database, where a shopping item of the one or more shopping items may be stored based on one or more previously stored shopping items marked as purchased.

BRIEF DESCRIPTION OF THE DRAWINGS

The various embodiments of the present consumer-oriented behavior prediction and notification systems now will be discussed in detail with an emphasis on highlighting the advantageous features. These embodiments depict the novel and non-obvious consumer-oriented behavior prediction and notification systems shown in the accompanying drawings, which are for illustrative purposes only. These drawings include the following figures, in which like numerals indicate like parts.

DETAILED DESCRIPTION

Figure 1:
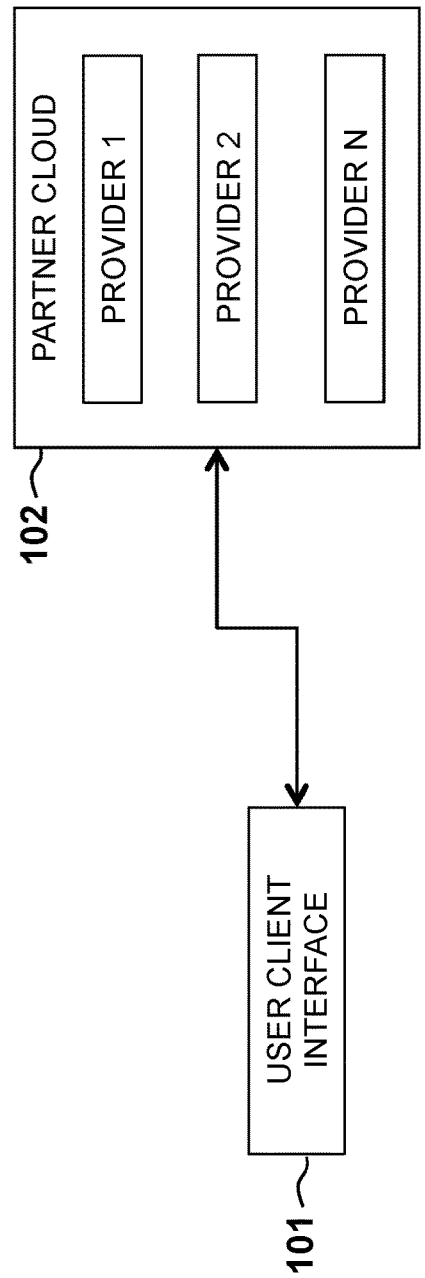
FIG. 1 is a first high-level block diagram of a consumer To-do system in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

Many of the same, or similar, items are available at a variety of stores that may be geographically disparate. In one example, the technical problem is that a user may not be aware of, or able to locate, the stores that contain needed items in an efficient manner. For example, a user may decide to drive ten miles from their house on one day to a store solely to get a first item and then drive five miles from their house the next day to another store solely to get a second item. The user would be unaware if both the first item and the second item could be available for purchase by the user without the need for two separate trips. The first item may be available in a first store one mile from the user's morning commute while the second item may be available in a second store two miles from the user's place of business. In one embodiment, the disclosed system and method address this technical problem by tracking the items desired by the user, tracking the location of one or more stores containing the tracked items, tracking the location of the user, and prompting the user when the distance between the user and a store containing the tracked item meets a pre-determined threshold. The user can then navigate to the store and obtain the item when it is convenient for the user to do so. In one embodiment, the disclosed system and method provides the practical application of prompting and guiding a user to a store for the purchase of a desired item in a manner that is efficient based on the location of both the user and the store.

In one example, the technical problem is that current-day consumer-centric products and services are meant for businesses. These products and/or services may push promotions and spam users, leaving them unsatisfied. In one embodiment, the disclosed system and method address this problem by making consumers the center of the business model and focusing on understanding what users want and attempting to provide better experiences without spamming or overwhelming the consumer.

In some embodiments, the current day customer model is flipped from business-centric to consumer-centric. Current business models from the likes of Google, Facebook, Amazon and others have been to overload consumers with advertisements and promotions even if they are not in the consumer's interest. Consumer's interest, in fact, comes second to the interest of their business partners. Consumers have little to no control over what type of promotions they want to see. Often this leads to user frustration and abandoning the usage of the solutions, such as a mobile app or webpage. In still more embodiments, users may login via voice or traditional login methods, add items to a shopping list via voice command, be prompted to buy an item on the shopping list when within a pre-determined proximity from a store, receive turn-by-turn navigation instructions, not only to the store, but also inside the store to locate the item, and receive competitive offers for each item, so that manufacturers compete for the user's business. Finally, the user can either mark or delete items from these lists so that they are not reminded repetitively. Consumers have traditionally shopped on the internet because of the potential time savings but are often not happy with the negative aspects of online shopping including shipping theft, shipping delays and the research time required for finding good price comparisons. Many embodiments of the current system offer an alternative to online shopping and can bring consumers back to brick-and-mortar locations for superior in-store shopping experiences.

Many of the embodiments in accordance with the present invention include a consumer-centric system that may present items to a user based on predicted shopping behavior. This may be accomplished by providing full control to consumers and providing a superior consumer experience. Using traditional graphical user interface (GUI) or a natural user interface (NUI), users can add to their shopping lists, To-do lists, and/or reminders to the system disclosed herein. When a consumer is in a relevant context, the consumer can be reminded of an item on a list to be fulfilled or taken care of. By way of example and not limitation, in the case of shopping list, the user can be reminded of relevant shopping items when the user is in the proximity of a store that sells those items. Similarly, in certain embodiments, a user may be reminded to purchase airplane tickets, such as when they are on sale or closer to the flying date.

Many embodiments of the present invention may also predict a consumer's behavior based on the user's historical behavior or by the collective behavior of a group of users with common interests. By way of example and not limitation, if a user frequently travels between two cities, or frequently buys certain items, the user may be reminded to buy those items when the user is in a relevant context. In a number of embodiments, the present invention may be applied to shopping lists, to-do lists, reminders, and/or recommendations for item purchases.

In additional embodiments, natural user interfaces can be used, such as voice. A user may add items they need to buy into their shopping list. By way of example and not limitation, a user may say, "I need to buy a bucket of paint" or "Please add a bucket of paint to my shopping list"—all at a click of a button or with a name-commanded voice prompt such as, but not limited to, "Sara." Prompts may include, for example, "Sara, I need to buy a bucket of paint," and when the user drives by a store that carries one or more items from the shopping list or if the name of the store was entered into the shopping list, the service may remind the user that they can buy certain shopping list items from the nearby store within the selected proximity. In further embodiments, users may decide to shop "now" or remind "later". In still further embodiments, the user may also have the ability to place items on hold for in-store pickup to save them time. In still yet further embodiments the system may also allow users to purchase and have items delivered. In still additional embodiments, the system may provide automatic navigation directions to the store and also in-store navigation to the location where the product is inside the store.

In still yet further embodiments, the user may decide to shop "now", the system may reach out to manufacturers and/or retailers to offer the user a real-time or near real-time competitive price and/or potential offers from a competitive brands, without spamming the user and keeping within their pre-determined desired level of user interaction, allowing the user to decide and pick a best offer and/or an offer from a preferred repeat vendor. In a number of embodiments, the service can learn the user's shopping habits and may generate one or more patterns based on these habits. In certain embodiments, a user may buy certain items on regular basis, even when the user is not explicitly adding items, and the system may remind the user to buy those items. By way of example and not limitation, if a user is buying airline tickets to Los Angeles every Friday, the system may remind the user to buy tickets closer to Friday if not already purchased and/or when a lower price deal is available.

In many embodiments, the system may also check a competitor's price as a comparison and offer the user two or more options. In still more embodiments, the system may book a restaurant reservation based on known times of previous user histories. By way of example and not limitation, other services that may be utilized by the system include paying bills, scheduling car washes/maintenance visits, or setting appointments. By way of example and not limitation, a user may ask the system via the natural voice recognition module, "Can you see if John is available to meet next Wednesday 5 pm", and the system may interact with one or more other services to send John a notification that can be accepted or changed at that time and relayed back to the user via the disclosed system. In still more embodiments, the system may acquire external knowledge to adapt and/or improve the user recommendations. By way of example and not limitation, a user may be reminded to wash their car on a certain day every week based on user history, and by utilizing external weather information, the system may refrain from offering to remind or schedule an appointment for the user on a rainy day.

With reference to FIG. 1, the present embodiments include a To-do system in accordance with an embodiment of the invention. In a number of embodiments, the system 100 may include a user client interface 101 that can represent an application with an interface running on a client device including, but not limited to, a mobile phone, a computer, tablets, smartwatches, and/or other internet connected devices. In many embodiments, the To-do system may implement consumer-oriented behavior prediction and notification systems by running an application on the user client interface 101 that may be in communication with outside partners and/or content providers. For example, a partner cloud 102 may represent content providers. In certain embodiments, the number of content providers may scale as needed for the specific application desired, and may be connected to providers such as, but not limited to, manufacturers, distributors, and/or retail stores.

While a variety of to-do systems are described above with reference to FIG. 1, the specific configurations and process flows of the to-do systems may be dependent upon the requirements of specific applications. For example, it can be appreciated by those skilled in the art that the exact types of devices, content providers, and communication channels used may be adjusted and scaled based on the size, complexity, and/or analytic needs of the users or clients. Additionally, the to-do system can run entirely on a single consumer device or may be distributed over many devices, perhaps all utilized by the same user to provide a seamless experience at all levels of Internet interaction. A discussion of cloud-based To-do system architectures is below.

Figure 2:
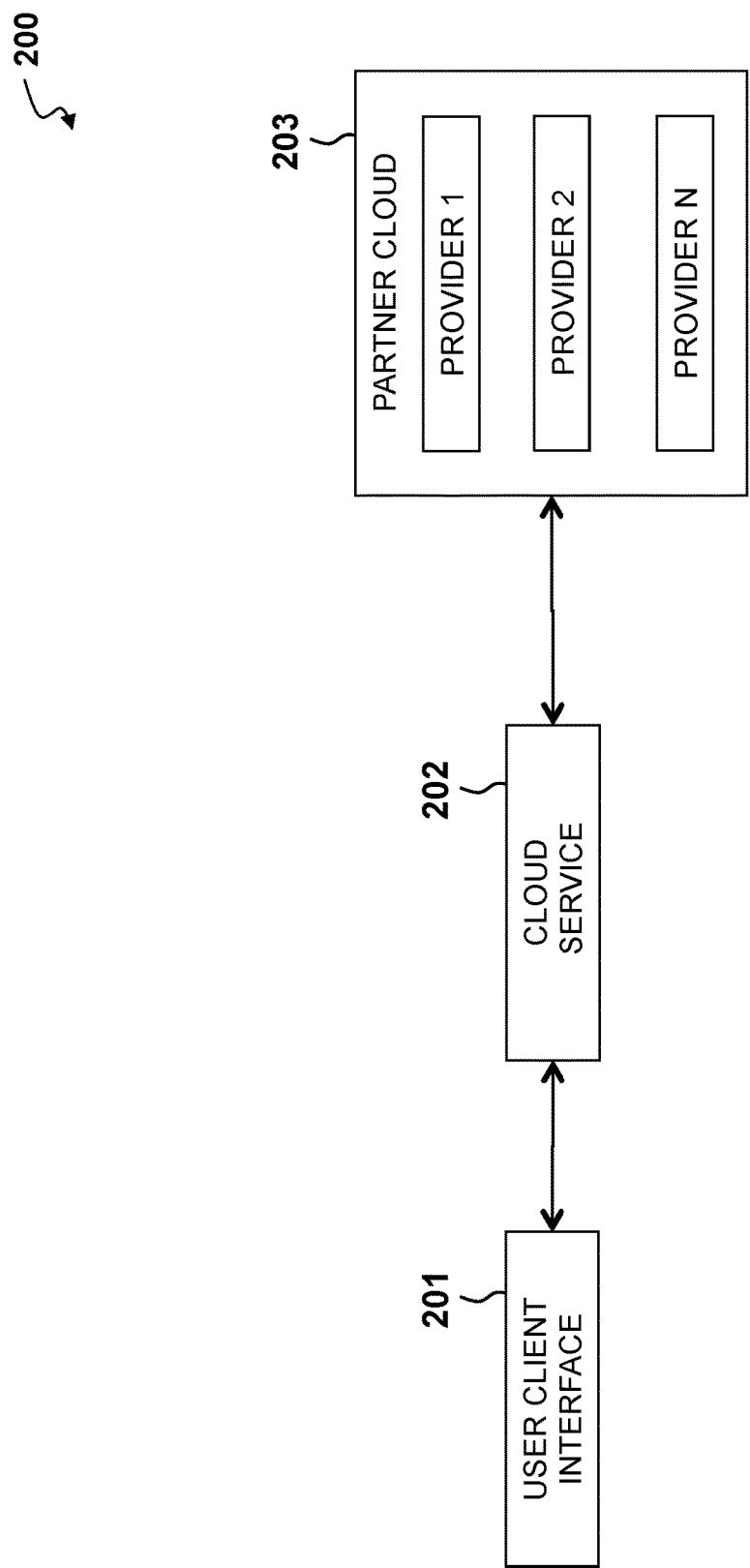
FIG. 2 is a second high-level block diagram of a consumer To-do system in accordance with an embodiment of the invention.

With reference to FIG. 2, some embodiments may include a cloud-based To-do system 200. In many embodiments, the cloud-based system 200 may include a user client interface 201 that may represent an application with an interface running on a client device including, but not limited to, a mobile phone, a computer, a tablet, a smartphone, a smartwatches, a wearable device, and/or other internet connected devices. In a number of embodiments, the user client interface may connect to a cloud service 202 which can handle a plurality of tasks associated with the consumer-oriented behavior prediction and notification processes. As those skilled in the art would appreciate, any device capable of connecting and communicating with a cloud service 202 could be utilized as a user client interface 201. These processes could include, but is not limited to, gathering and parsing contextual content from manufacturers and distributors. In additional embodiments, the consumer-oriented behavior prediction and notification processes may achieved by connecting to a partner cloud 203 that may include a plurality of partners. In further embodiments, the increased processing done by the cloud service 202 may reduce the processing and/or power requirements of the user client interface 201 and corresponding device. In still further embodiments, the lower processing requirements of the user client interface 201 may allow the consumer-oriented behavior prediction and notification system to be installed on devices that have smaller battery life and/or processing power including, but not limited to, wearables, smartwatches, and the like.

While a variety of cloud-based To-do systems are described above with reference to FIG. 2, the specific configurations and process flows of the To-do systems are largely dependent upon the requirements of specific applications. For example, it can be appreciated by those skilled in the art that the exact types of processes, data, and communication channels utilized by the cloud-based service can be adjusted and scaled based on the size, complexity, and/or analytic needs of the users or clients. Additionally, the cloud-based To-do system 200 can run entirely on a single consumer device or can be distributed over many devices, perhaps all utilized by the same user to provide a seamless experience at all levels of Internet interaction. A more-detailed discussion of the client user interface is below.

Figure 3:
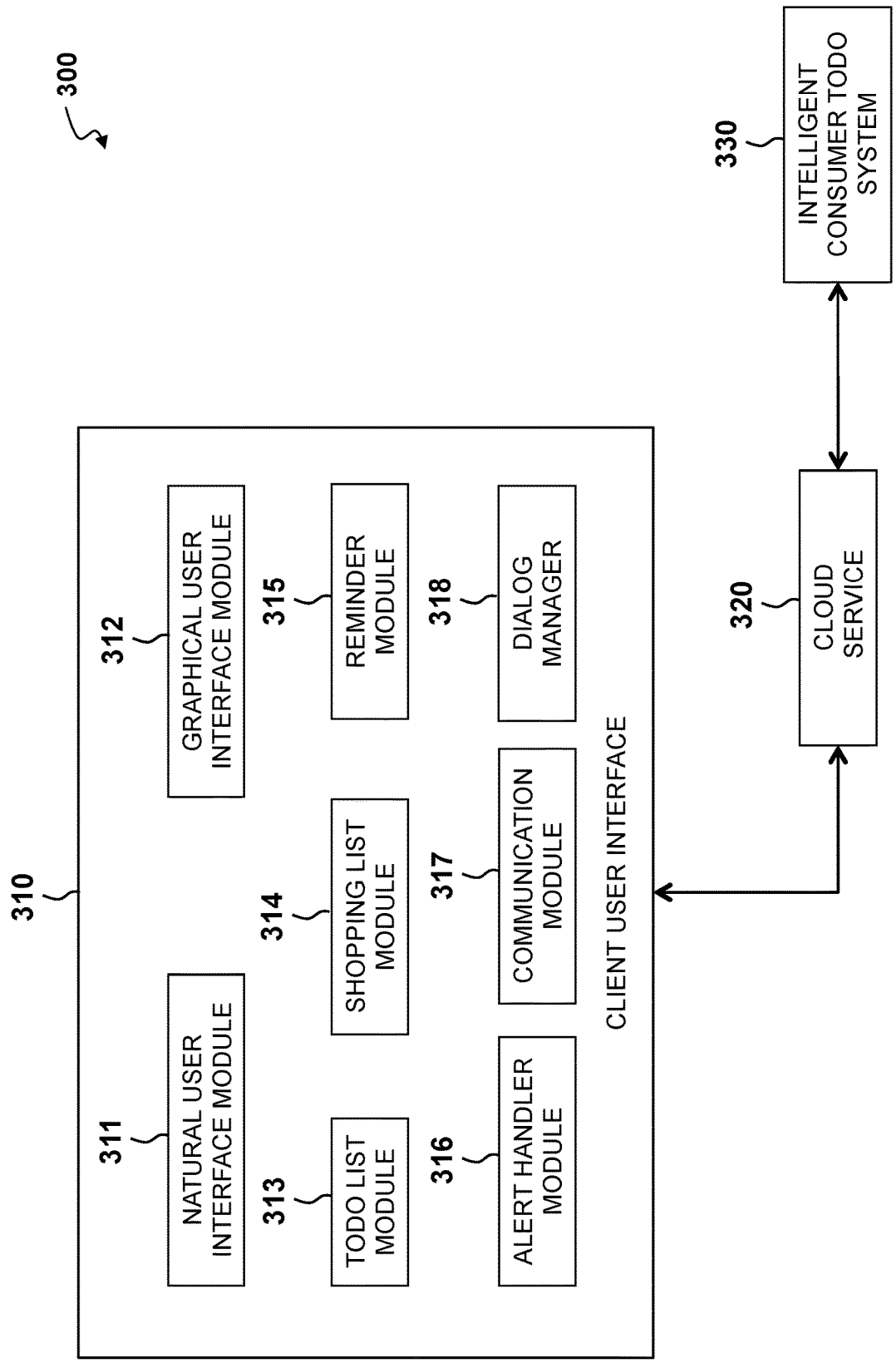
FIG. 3 is a high-level block diagram of a consumer interface of a consumer-oriented behavior prediction and notification system in accordance with an embodiment of the invention.

With reference to FIG. 3, the present embodiments include a client user interface 310 connected to a cloud-based To-do system 300 in accordance with an embodiment of the invention. In many embodiments, the To-do system 300 may include a client user interface 310, a cloud-based service 320, and an intelligent consumer To-do system 330. In a number of embodiments, the client user device 310 comprises a natural user interface module 311, a graphical user interface module 312, a To-do list module 313, a shopping list module 314, a reminder module 315, an alert handler module 316, a communication module 317 and/or a dialog manager 318. In further embodiments, the natural user interface module 311 may utilize voice, text, gestures, mental signals, and/or work in conjunction with a graphical user interface (GUI) module 312 to interact with the user. In certain embodiments, the user may interact with the natural user interface module 311 or graphical user interface module 312 to add, delete, or delete modules in the client user interface 310. In additional embodiments, the user can also utilize the natural user interface module 311 and graphical user interface module 312 to manage and manipulate items in the To-do list module 313, the shopping list module 314, and/or reminder module 315.

In further embodiments, the client user interface 310 may include a communication module 317 that can establish and provide communication channels with external systems including, but not limited to, a cloud-based service 320 and/or intelligent consumer To-do system 330. In still further embodiments, the communication module 317 is utilized to offload heavy computation processes to a cloud-based service 320 that may then process the data and transmit the results back to the client user interface 310. In yet further embodiments, the processed data transmitted back from the cloud-based service 320 may be alert data for processing by the alert handler module 316. In still yet further embodiments, the alert handler module 316 processes alert data and produces an alert to the user that can be based on many triggers including, but not limited to, user location, time of day, updated pricing, and/or newly discovered online shopping information. By way of example and not limitation, when a user comes into proximity of a store, the alert handler module 316 produces an alert via either the natural user interface module 311 and/or the graphical user interface 312 to indicate to the user that the user may wish to purchase an item at the store and/or the item at the nearby store is on sale or otherwise below a certain pre-determined price threshold. In additional embodiments, the dialog manager 318 can be utilized to engage a user in a meaningful conversation using voice and/or text.

While a variety of client user interface architectures are described above with reference to FIG. 3, the specific configurations and process flows of the client user interfaces are largely dependent upon the requirements of specific applications. For example, it can be appreciated by those skilled in the art that the exact types, number, and characteristics of the modules utilized in the client user interface can be adjusted and scaled based on the size, complexity, and/or analytic needs of the users or clients. Additionally, the client user interface can run entirely on a single consumer device or can be distributed over many devices as well as being supported in part by hardware-based solutions such as, but not limited to external sensors, and/or devices. A more-detailed discussion of intelligent consumer To-do systems is below.

Figure 4:
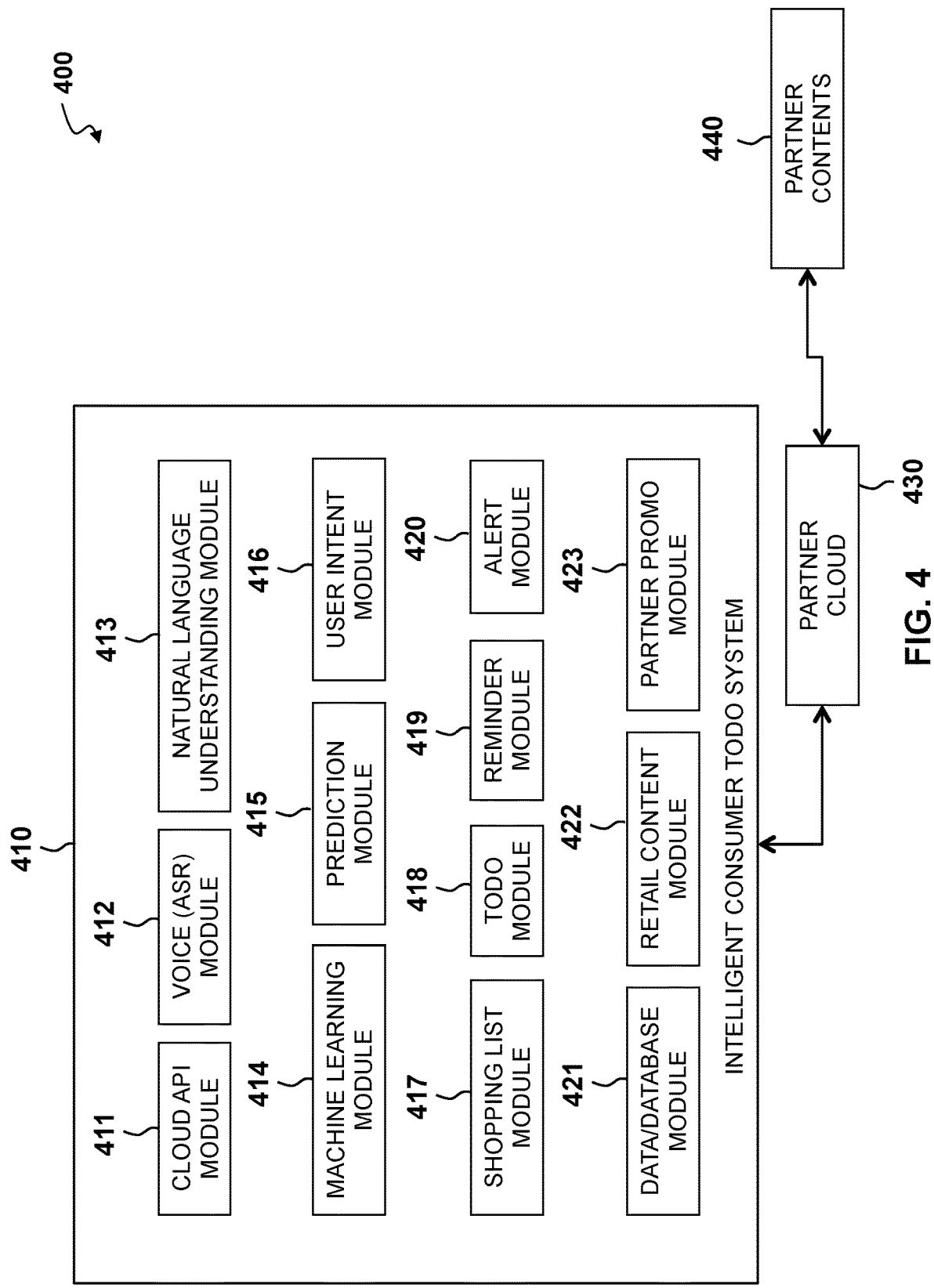
FIG. 4 is a cloud-based system of the consumer-oriented behavior prediction and notification system in accordance with an embodiment of the invention.

With reference to FIG. 4, the present embodiments include a cloud-based intelligent consumer To-do system 400 in accordance with an embodiment of the invention. In many embodiments, the cloud-based To-do system 400 for consumer-oriented behavior prediction and notification 400 may include an intelligent consumer To-do system 410, a partner (third-party) cloud service 430, and partner content for processing 440. In a number of embodiments, the intelligent consumer To-do system 410 may include a Cloud API module 411, a voice/automated speech recognition (ASR) module 412, a natural language understanding module 413, a machine learning module 414, a prediction module 415, a user intent module 416, a shopping list module 417, a To-do module 418, a reminder module 419, an alert module 420, a data/database module 421, a retail content module 422, and/or a partner promotional module 423.

In additional embodiments, the cloud API module 411 can provide methods, protocols, and/or processes for communicating with other devices in the system including, but not limited to, other client devices running the client user interface applications to receive computationally heavy data and processes. In still additional embodiments, the voice (ASR) module 412 may allow for the processing of voice commands received by a client user interface. In still yet additional embodiments, the machine learning module 414 may work in conjunction with the voice (ASR) module 412 to process and better predict a user's voice commands with higher accuracy. In certain embodiments, the machine learning module 414 may parse the received voice commands from a user and either convert the received voice commands into text for further processing, and/or call a command to implement a command requested by the user. In more additional embodiments, the natural language understanding module 413 may allow the intelligent consumer To-do system 410 to understand natural text or speech converted into text by the machine learning module 414. In certain other embodiments, the output of the natural language understanding module 413 may be fed into the user intent module 416 to further process and understand the user's intent with interacting with the system 400. In yet more additional embodiments, the prediction module 415 may fill in missing pieces in the provided user data and/or create predictions of user behavior based on previously stored interactions and provide those predictions to the user. In still more additional embodiments, the shopping list module 417, To-do list module 418, and/or reminder module 419 allow for the creation, addition, updating, and deleting of list items in their respective databases. By way of example and not limitation, a user who desires to add to a shopping list or wants to delete an item on a To-do list may receive the voice command data from the user client interface through the cloud API module 411, recognize the data as voice data for processing and conversion into text in the voice (ASR) module 412, utilize the machine learning module 417 to compare the voice data to past interactions, process the voice command and machine learning data in the natural language understanding module 413 to determine a recognized command that is fed into the user intent module 416 for processing by the shopping list module 417 to add the requested item and the by the To-do list module 418 to delete the requested item by the user.

In further embodiments, the alert module 420 can generate and send alerts to the client user interface which can then be picked up in the alert handler module in the client device. In still further embodiments, the alert data may be generated by checking data such as, but not limited to, user location against a pre-determined set of data from other modules including the retail content module 422. In yet further embodiments, the retail content module 422 can be triggered to process the shopping list module 417, To-do module 418, and/or reminder module 419 to retrieve data that may be relevant for the user including, but not limited to, what items are contained within the store the user may currently be in and if any stored items in the relevant modules 417, 418, 419 can be satisfied within a pre-determined distance from the user's location. In still yet further embodiments, the retail content module 422 may communicate with a partner promotional module 423 to gather further data which may include personalized promotions which may then be presented to the user via the user client interface. By way of example and not limitation, a user may enter a store, the user client interface communicates the location to the intelligent consumer To-do system 410 as GPS coordinates, which are then processed by the retail content module to recognize that the user is within a participating retail partner, and then cross-references the known items contained in that store with the items in the user's shopping list module 417 or To-do module 418 by communicating with the data/database module 421. Then, the partner promotional module 423 may communicate with partner content providers 440 via a third part cloud service 430 to provide promotional data that is personalized to the user and their shopping or To-do list, which can then be presented to the user via the user client interface as a reminder to buy something in the store and any corresponding sales on items on the user's shopping list.

While a variety of cloud-based intelligent consumer To-do systems are described above with reference to FIG. 4, the specific configurations and process flows of the cloud-based intelligent consumer To-do systems are largely dependent upon the requirements of specific applications. For example, it can be appreciated by those skilled in the art that the exact number of modules utilized in the client user interface can be adjusted and scaled based on the size, complexity, and/or analytic needs of the users or clients. Additionally, the intelligent consumer To-do system may also be in communication with multiple users per instance of the system as well as potentially utilizing data from multiple users to better process user data with greater accuracy. A discussion of an example process for adding an item to a shopping list is below.

Figure 5:
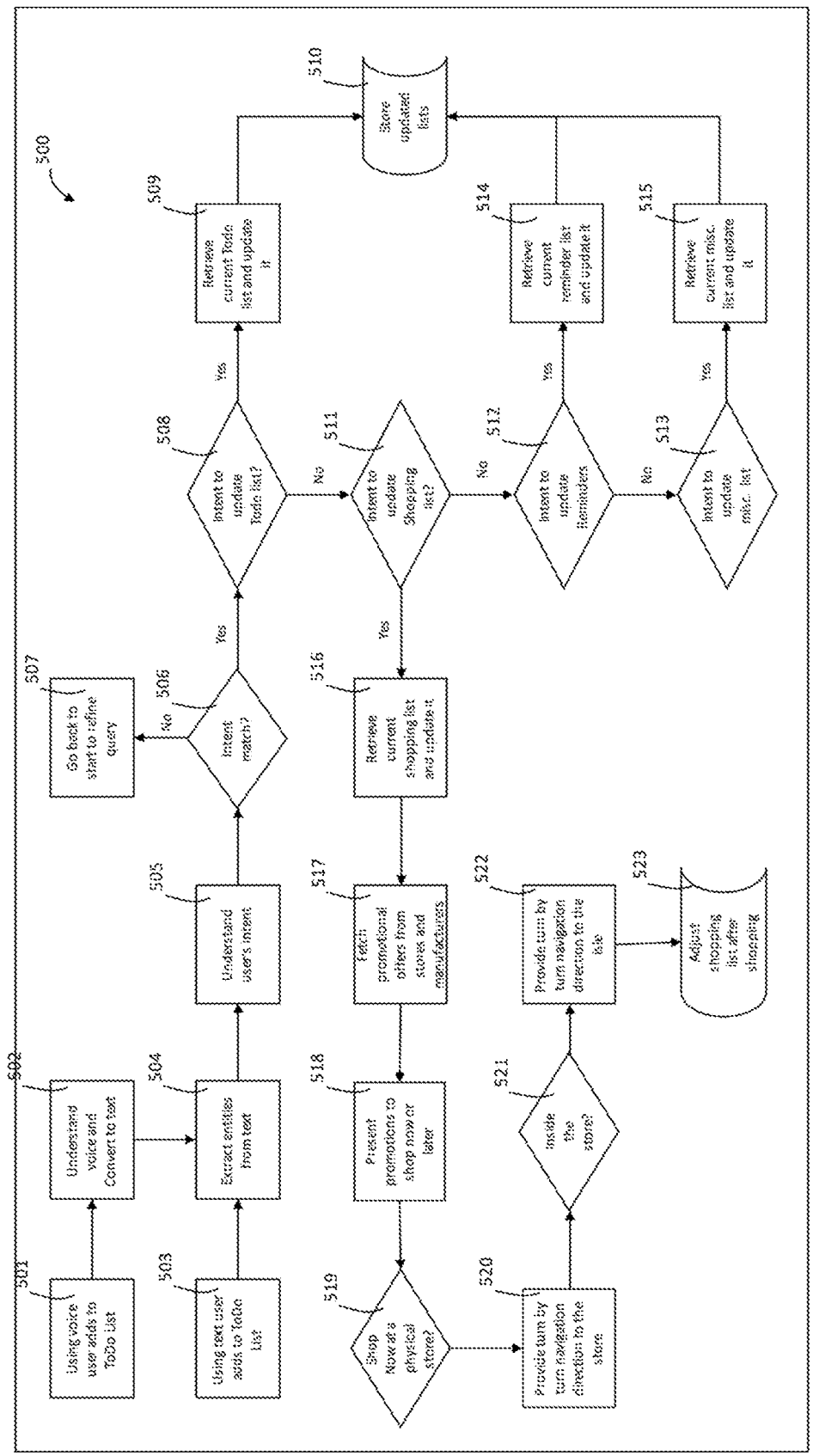
FIG. 5 is a process for adding items to a list in a consumer-oriented behavior prediction and notification system in accordance with an embodiment of the invention.

With reference to FIG. 5, the present embodiments include a process for updating a shopping list in accordance with an embodiment of the invention. In many embodiments, the process 500 may begin by a user using voice 501 or text 503 to add an item to a list. In a number of embodiments, when the user uses voice 501 to add items to a list, the process 500 attempts to understand 502 the voice and convert it to text. In still many embodiments, text that is either entered by the user 503 as a command or processed from voice 502 into text can then be processed to extract 504 entities from the text. In additional embodiments, when the entities are extracted 504, the user's intent can then be understood 505. In certain embodiments, if there is no intent match 506 based on the understood intent 505 then the process 500 goes back to the start to refine the query 507. In other embodiments, when the intent is matched 506, then the intent is processed to determine what step in the process should occur next. In still additional embodiments, the process 500 determines if the user's intent was to update the To-do list 508, the shopping list 511, reminders 512, or any other miscellaneous list 513. In yet additional embodiments, when the user's intent is to update the To-do list 508, then the current To-do list is retrieved and updated 509, and then stored 510 as an updated list. In still additional embodiments, when the user does not intend to update the To-do list 508, then the process 500 will check to see if the user's intent was to update the shopping list 511.

In additional embodiments, when the user intends to update the shopping list, the process 500 will retrieve 516 the current shopping list and update it based on the user's intent. In still additional embodiments, the process 500 can fetch 517 promotional offers from stores and manufacturers. In yet additional embodiments, the promotions may be presented 518 to the shopper. In still yet additional embodiments, when the user indicates that they wish to shop 519 for the promoted product, the process 500 may provide 520 turn-by-turn navigation to the store selling the promoted item. In more additional embodiments, when the user is determined to be inside 521 the store, the process 500 may provide 522 turn-by-turn navigation to the aisle the promoted item may be located within the store. In certain embodiments, the retail stores may prepare and keep a user's order ready for them at the store or in a specialized location such as a pick-up locker or other specialized kiosk. In further additional embodiments, the system may utilize voice commands as a security measure to verify identity and approve payment for items during checkout processes either via the application remotely or at a check-out station in the store itself. In still more additional embodiments, the process 500 can adjust 523 the shopping list after the user has completed the shopping trip in the store.

In yet further embodiments, when the user intent is not to update 511 the shopping list, but to update 512 the reminder list, the process 500 may retrieve 514 the current reminder list and update it before storing 510 the updated list. Likewise, in more further embodiments, when the user does not intend to update 512 their reminders, the process 500 can then check to determine if the user intends to update 513 any other miscellaneous list. In still more further embodiments, the process 500 can retrieve 515 and update the determined miscellaneous list before storing 510 the updated list.

Figure 6:
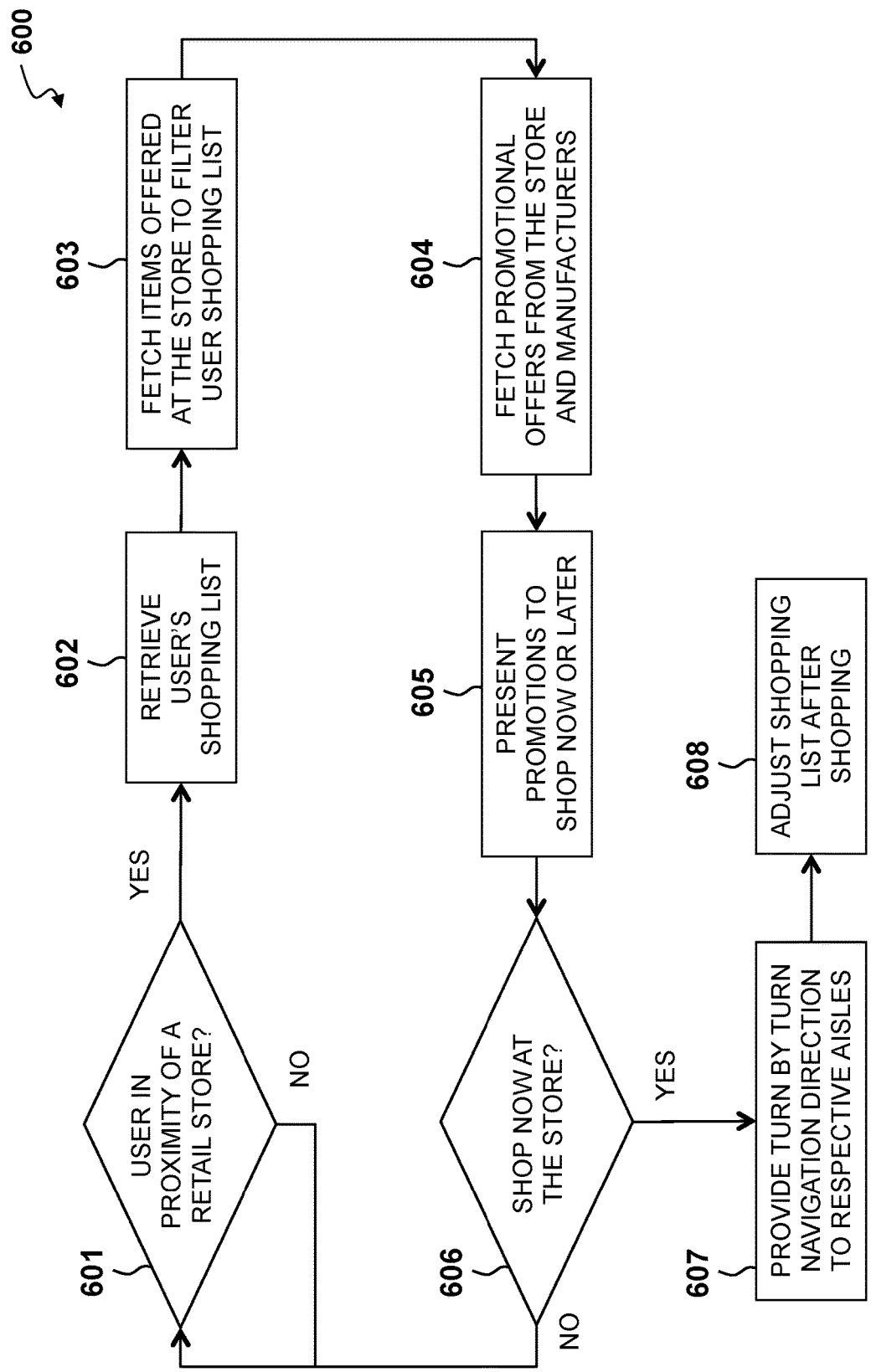
FIG. 6 is a process for implementing a consumer alert trigger in a consumer-oriented behavior prediction and notification system in accordance with an embodiment of the invention.

With reference to FIG. 6, the present embodiments include a process for alerting a user via a proximity alert in accordance with an embodiment of the invention. In many embodiments, the process 600 may begin by determining if a user 601 is in the proximity of a retail store. In many embodiments, this can be accomplished via tracking methods including, but not limited to, Global Positioning System (GPS) and/or Wi-Fi® tracking. In still many embodiments, the location information of the user is determined by the client user interface and transmitted to a cloud service for processing. In still many more embodiments, when the user 601 is determined to be within the proximity of a partner location, the system can retrieve 602 the user's shopping list data. In additional embodiments, the process 600 can fetch 603 items offered at the store to filter the user's shopping list data. In certain further embodiments, the user's list may be obtained from a database module in the system. In yet further certain embodiments, the database module may also contain manufacturer data regarding the items in the user's shopping list. In other embodiments, the system may communicate via a third-party cloud system to obtain partner content corresponding to items in the user's shopping list. Additionally, in further embodiments, the process 600 can fetch 604 promotional offers from the store and manufacturers. In still additional embodiments, the fetch promotional offer data is checked against the fetched items data and the shopping list data. In yet additional embodiments, the processed data can be presented 605 to the user. In certain embodiments, the user can be presented with a prompt to shop for the item now or later. In more additional embodiments, the offers presented to the user may be filtered down to a pre-determined number of items in order to potentially increase a user's satisfaction and attention. In further additional embodiments, participating stores may have items selected for purchase by the user ready for pickup upon arrival by the user. In still further additional embodiments, the user can pre-pay for in-store pickup items using a voice-activated system for authentication and approval, thus saving the user the time otherwise necessary to find the items and remain in a check-out line at the store. In still further embodiments, when the user indicates that they wish to shop 606 at the store now for the presented item, the process 600 can provide 607 turn by turn directions to the respective aisles the promoted item may be located. In yet further embodiments, the shopping list may be adjusted 608 after the shopping trip has been completed by the user. In certain additional embodiments, the system adjusts 608 the shopping list once the user has been determined to have left the proximity of the store.

While a variety of cloud-based intelligent consumer To-do system processes are described above with reference to FIGS. 5, and 6 the specific configurations and process flows of the cloud-based intelligent consumer To-do systems are largely dependent upon the requirements of specific applications. For example, it can be appreciated by those skilled in the art that the actions of the user may include actions other than updating or providing proximity alerts. Similar processes may include adding items, deleting items, changing the characteristics of items, or adjusting settings relating to how the system alerts and interacts with the user. Additionally, the user input may be input beyond just voice and text, but could also be input via graphical user interface or via gestures or other methods of input. A discussion of an example software stack is below.

Figure 7:
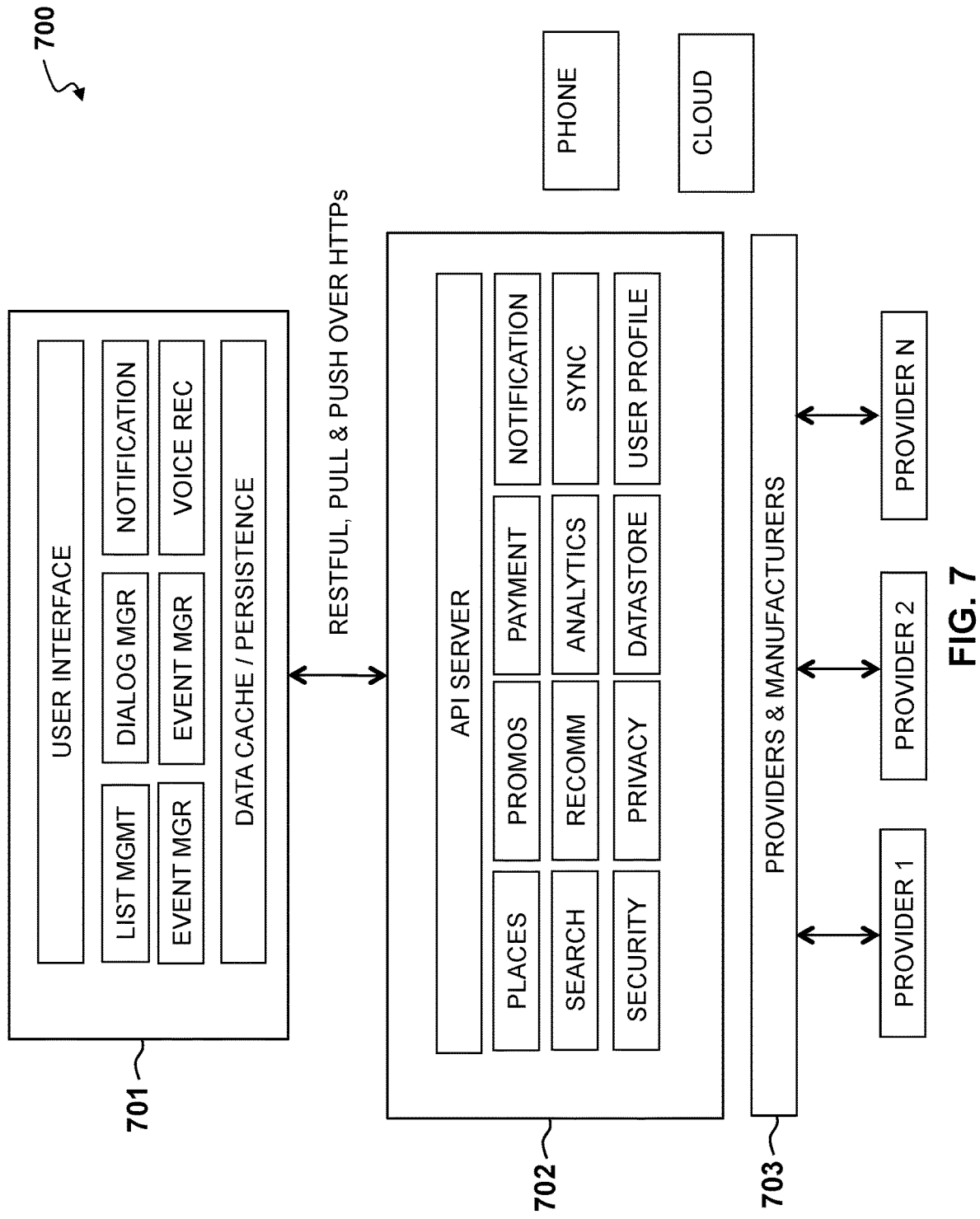
FIG. 7 is an example software stack for a consumer-oriented behavior prediction and notification system in accordance with an embodiment of the invention.

With reference to FIG. 7, the present embodiments include a software stack 700 in accordance with an embodiment of the invention. In many embodiments, the software stack 700 comprises a user client interface 701, a cloud-based server 702, and partner content maps 703 to providers and manufacturers. In a number of embodiments, the user interface module stack 701 provides the natural user interface and graphical user interface. In still more embodiments, the list management software of the user client interface stack 701 can manage various lists including, but not limited to, the To-do list using a To-do list module, a shopping list using a shopping list module, and/or a reminder list using a reminder list module. In yet more embodiments, the event manager software may manage alerts using the alert module and notifies the user using the notification software. In additional embodiments, the data cache/persistence software may be utilized to retain data related to the user in order to facilitate an improved user experience. In still additional embodiments, authentication software can be used to authenticate a user and/or restrict access to non-users.

In certain embodiments, communication between the user client interface software 701 and the cloud-based service software 702 is accomplished via Rest communication with an API server. In further embodiments, the places software can store and retrieve information about different retail outlets where the user can potentially shop. In still further embodiments, the promos software utilizes the partner promotional module to communicate with partner cloud services and fetch personalized promotions. In yet further embodiments, the payment software can manage payment for and receipt of all purchases. In certain further embodiments, payment software can utilized stored payment and receipts to predict a user's shopping behavior and recommend items to purchase. In still yet further embodiments, search software modules can use a database module to search for places, stores, or shopping lists to narrow down lists and to provide information to the user. In more further embodiments, analytics software modules can gather big data to understand various patterns and generate recommendations for users and reports for the system. In still more further embodiments, user profiles may be maintained to store a user's personal details, shopping patterns, and other information. In certain additional embodiments, the user may limit the amount of data to be retained in a profile. In certain other embodiments, the user may be incentivized to retain more user data and/or to share personal data with the system and other data aggregation uses. In yet more further embodiments, a data store can be any database module or other data storage and retrieval medium. In yet additional further embodiments, security software can be used to ensure the unauthorized users are denied access to various data and functionality. In certain embodiments, the security features may be authorized or deactivated via a voice command that may recognize the user's voice and utilize the user's commands as instructions and/or passwords. In still yet further embodiments, privacy software may maintain the data in a secure way, including, but not limited to, isolating the personal data from non-personal data.

While a variety of software stacks for cloud-based intelligent consumer To-do systems are described above with reference to FIG. 7, the specific configurations and software utilized is largely dependent upon the requirements of specific applications. For example, it can be appreciated by those skilled in the art that the software may be located on multiple machines over otherwise distributed in a cloud-based system. Additionally, the cloud-based service software stack may also be implemented locally on the user client device.

Figure 8:
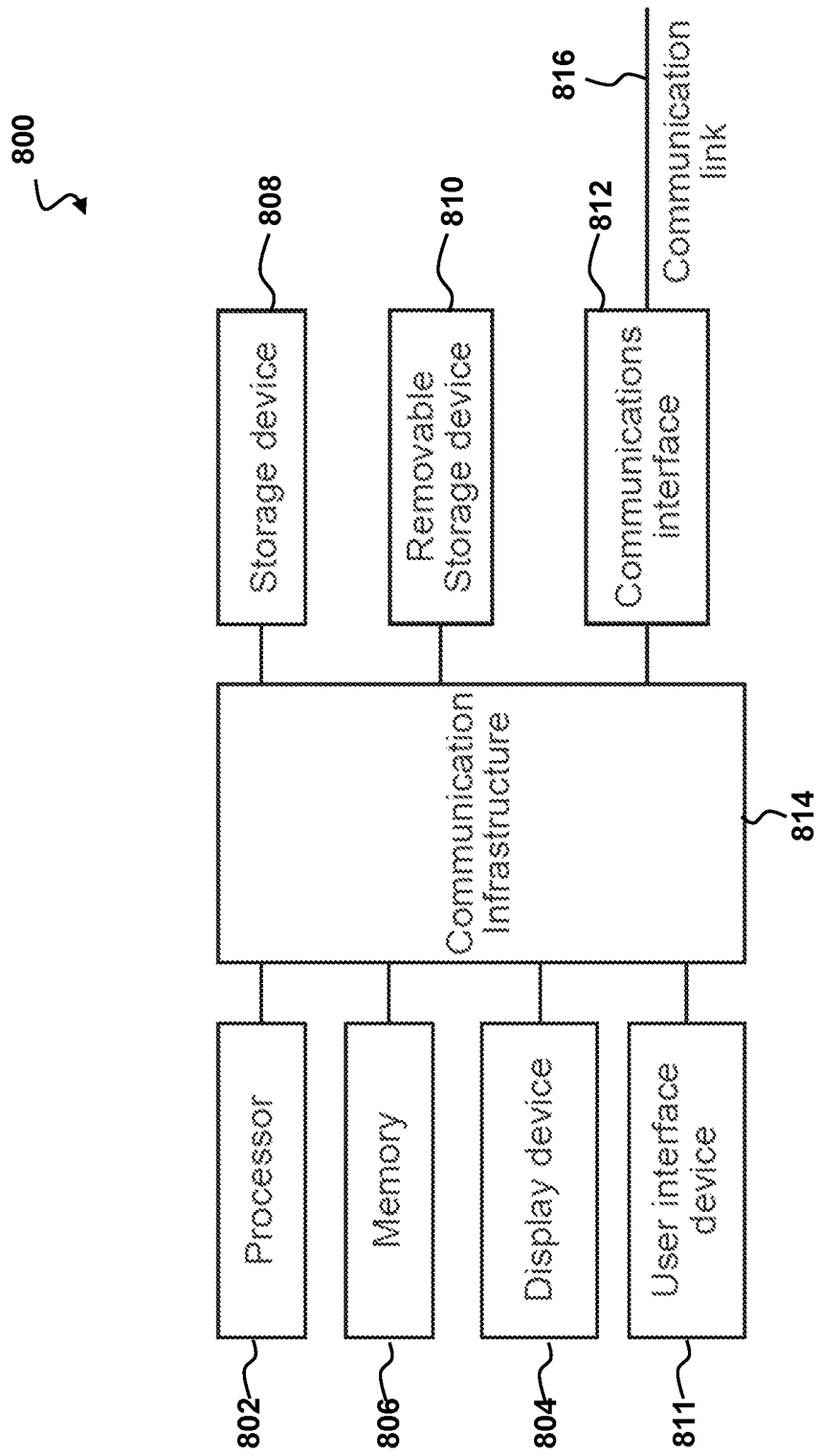
FIG. 8 is a high-level block diagram and process of a computing system in accordance with an embodiment of the invention.

With reference to FIG. 8, the present embodiments include a high-level block diagram 800 showing a computing system comprising a computer system useful for implementing an embodiment of the system and process for consumer-oriented advertising and notifications based on predicted behaviors and shopping history, disclosed herein. Embodiments of the system may be implemented in different computing environments. In many embodiments, the computer system can include one or more processors 802, and can further include an electronic display device 804 (e.g., for displaying graphics, text, and other data), a main memory 806 (e.g., random access memory (RAM)), storage device 808, a removable storage device 810 (e.g., removable storage drive, a removable memory module, a magnetic tape drive, an optical disk drive, a computer readable medium having stored therein computer software and/or data), user interface device 811 (e.g., keyboard, touch screen, keypad, pointing device), and a communication interface 812 (e.g., modem, a network interface (such as an Ethernet card), a communications port, or a PCMCIA slot and card). In a number of embodiments, the communication interface 812 allows software and data to be transferred between the computer system and external devices. In more embodiments, the system may further include a communications infrastructure 814 (e.g., a communications bus, cross-over bar, or network) to which the aforementioned devices/modules are connected as shown.

In still more embodiments, information can be transferred via the communications interface 814 and may be in the form of signals such as electronic, electromagnetic, optical, or other signals capable of being received by the communications interface 814, via a communication link 816 that carries signals and may be implemented using wire or cable, fiber optics, a phone line, a cellular/mobile phone link, an radio frequency (RF) link, and/or other communication channels. In yet more embodiments, computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are often stored in main memory and/or secondary memory. Computer programs may also be received via a communications interface 812. Such computer programs, when executed, may enable the computer system to perform the features of the embodiments as discussed herein. In particular, the computer programs, when executed, can enable the processor and/or multi-core processor to perform the features of the computer system. Such computer programs may represent controllers of the computer system.

Figure 9:
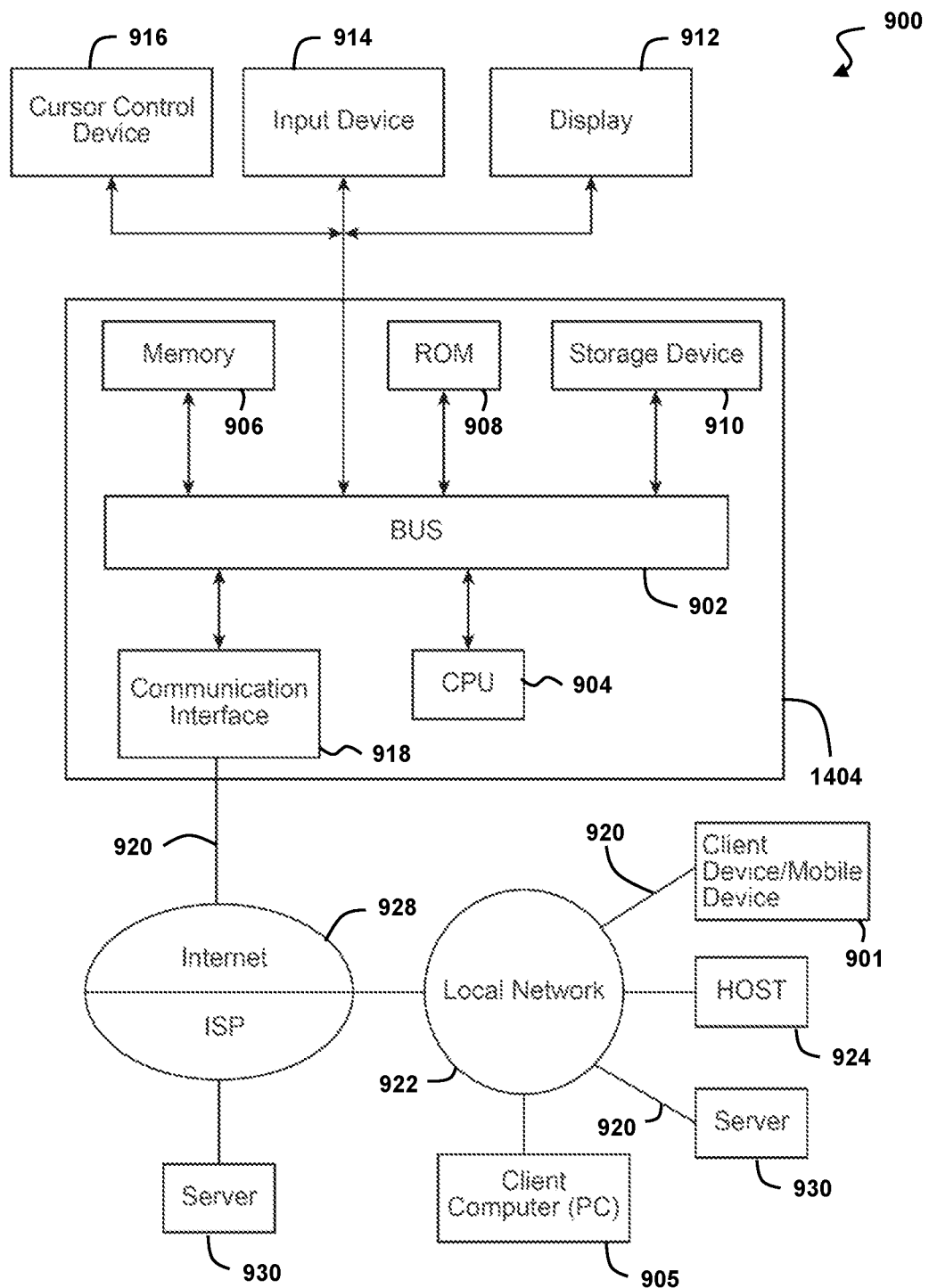
FIG. 9 is a block diagram and process of a system for a consumer-oriented behavior prediction and notification system in accordance with an embodiment of the invention.

With reference to FIG. 9, the present embodiments include a block diagram of an example system 900 in which an embodiment may be implemented. In additional embodiments, the system 900 can include one or more client devices 901 such as consumer electronics devices, connected to one or more server computing systems 930. In still additional embodiments, a server 930 may include a bus 902 or other communication mechanism for communicating information, and a processor (CPU) 904 coupled with the bus 902 for processing information. In yet additional embodiments, the server 930 may also include a main memory 906, such as a random access memory (RAM) or other dynamic storage device, coupled to the bus 902 for storing information and instructions to be executed by the processor 904. In still yet additional embodiments, the main memory 906 also may be used for storing temporary variables or other intermediate information during execution or instructions to be executed by the processor 904. In more additional embodiments, the server computer system 930 may further include a read only memory (ROM) 908 or other static storage device coupled to the bus 902 for storing static information and instructions for the processor 904. In still more additional embodiments, a storage device 910, such as a magnetic disk or optical disk, may be provided and coupled to the bus 902 for storing information and instructions. In yet more additional embodiments, the bus 902 may contain, for example, thirty-two address lines for addressing video memory or main memory 906. In many embodiments, the bus 902 can also include, for example, a 32-bit data bus for transferring data between and among the components, such as the CPU 904, the main memory 906, video memory and the storage 910. Alternatively, in other embodiments, multiplex data/address lines may be used instead of separate data and address lines.

In further embodiments, the server 930 may be coupled via the bus 902 to a display 912 for displaying information to a computer user. In still further embodiments, an input device 914, including alphanumeric and other keys, can be coupled to the bus 902 for communicating information and command selections to the processor 904. In certain embodiments, other types of user input device may comprise cursor control 916, such as a mouse, a trackball, or cursor direction keys for communicating direction information and command selections to the processor 904 and for controlling cursor movement on the display 912.

According to some embodiments, functions are performed by the processor 904 executing one or more sequences of one or more instructions contained in the main memory 906. In many such embodiments, instructions may be read into the main memory 906 from another computer-readable medium, such as the storage device 910. In a number of embodiments, execution of the sequences of instructions contained in the main memory 906 can cause the processor 904 to perform the process steps described herein. In still more embodiments, one or more processors in a multi-processing arrangement may also be employed to execute the sequences of instructions contained in the main memory 906. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products can be a means for providing software to the computer system. The computer readable medium may allow the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) can be stored in main memory and/or secondary memory. Computer programs may also be received via a communications interface. Such computer programs, when executed, may enable the computer system to perform the features of the embodiments as discussed herein. In particular, the computer programs, when executed, can enable the processor multi-core processor to perform the features of the computer system. Accordingly, such computer programs may represent controllers of the computer system.

Generally, the term "computer-readable medium" as used herein refers to any medium that participated in providing instructions to the processor 904 for execution. Such a medium may take many forms, including but not limited to, non-volatile media, volatile media, and transmission media. Non-volatile media includes, for example, optical or magnetic disks, such as the storage device 910. Volatile media includes dynamic memory, such as the main memory 906. Transmission media includes coaxial cables, copper wire and fiber optics, including the wires that comprise the bus 902. Transmission media can also take the form of acoustic or light waves, such as those generated during radio wave and infrared data communications.

Common forms of computer-readable media may include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 904 for execution. By way of example and not limitation, the instructions may initially be carried on a magnetic disk of a remote computer which can load the instructions into its dynamic memory and send the instructions over a data line and/or network. A network connection local to the server 930 can receive the data on the data line and use a transmitter to convert the data to an alternative signal. An alternative signal detector coupled to the bus 902 can receive the data carried in the alternative signal and place the data on the bus 902. The bus 902 may then carry the data to the main memory 906, from which the processor 904 can retrieve and execute the instructions. In these embodiments, the instructions received from the main memory 906 may optionally be stored on the storage device 910 either before or after execution by the processor 904.

In numerous embodiments, the server 930 can also include a communication interface 918 coupled to the bus 902. In still numerous embodiments, the communication interface 918 may provide a two-way data communication coupling to a network link 920 that is connected to the world wide packet data communication network now commonly referred to as the Internet 928. The Internet 928 can use electrical, electromagnetic or optical signals that carry digital data streams. In many more embodiments, the signals through the various networks and the signals on the network link 920 and through the communication interface 918, which carry the digital data to and from the server 930, can be forms or carrier waves transporting the information.

In another embodiment of the server 930, interface 918 can be connected to a network 922 via a communication link 920. By way of example and not limitation, the communication interface 918 may be an integrated services digital network (ISDN) card or any other type of modem to provide a data communication connection to a corresponding type of telephone or other data line, which can comprise part of the network link 920. As another example, the communication interface 918 may be a local area network (LAN) or other optical card to provide a data communication connection to a compatible LAN or optical network. Wireless links may also be implemented in a similar manner. In almost any such implementation, the communication interface 918 can send and receive electrical electromagnetic or optical signals that carry digital data streams representing various types of information.

In further additional embodiments, the network link 920 can typically provide data communication through one or more networks to other data devices. By way of example and not limitation, the network link 920 may provide a connection through the local network 922 to a host computer 924 or to data equipment operated by an Internet Service Provider (ISP). The ISP may then, in turn, provide data communication services through the Internet 928. The local network 922 and the Internet 928 may both use electrical, electromagnetic or optical signals that carry digital data streams. In still further additional embodiments, the signals through the various networks and the signals on the network link 920 and through the communication interface 918, which carry the digital data to and from the server 930, can be forms or carrier waves transporting the information.

In many embodiments, the server 930 can send/receive messages and data, including e-mail, program code, through the network, the network link 920 and the communication interface 918. In more embodiments, the communication interface 918 can comprise a USB/Tuner and the network link 920 may be an antenna or cable for connecting the server 930 to a cable provider, satellite provider or other terrestrial transmission system for receiving messages, data and program code from another source.

In still more embodiments, the example versions of the embodiments described herein may be implemented as logical operations in a distributed processing system such as the system 900 including the servers 930. The logical operations of the embodiments may be implemented as a sequence of steps executing in the server 930, and as interconnected machine modules within the system 900. The implementation in such embodiments is a matter of choice and can depend upon a number of factors including, but not limited to, the performance of the system 900 implementing the embodiments. As such, the logical operations constituting said example versions of the embodiments are referred to for e.g., as operations, steps or modules.

Similar to a server 930 described above, in many embodiments, a client device 901 can include a processor, memory, storage device, display, input device and communication interface (e.g., e-mail interface) for connecting the client device to the Internet 928, the ISP, or LAN 922, for communication with the servers 930. The system 900 can further include in certain embodiments, computers (e.g., personal computers, computing nodes) 905 operating in the same manner as client devices 901, where a user can utilize one or more computers 905 to manage data in the server 930.

Figure 10:
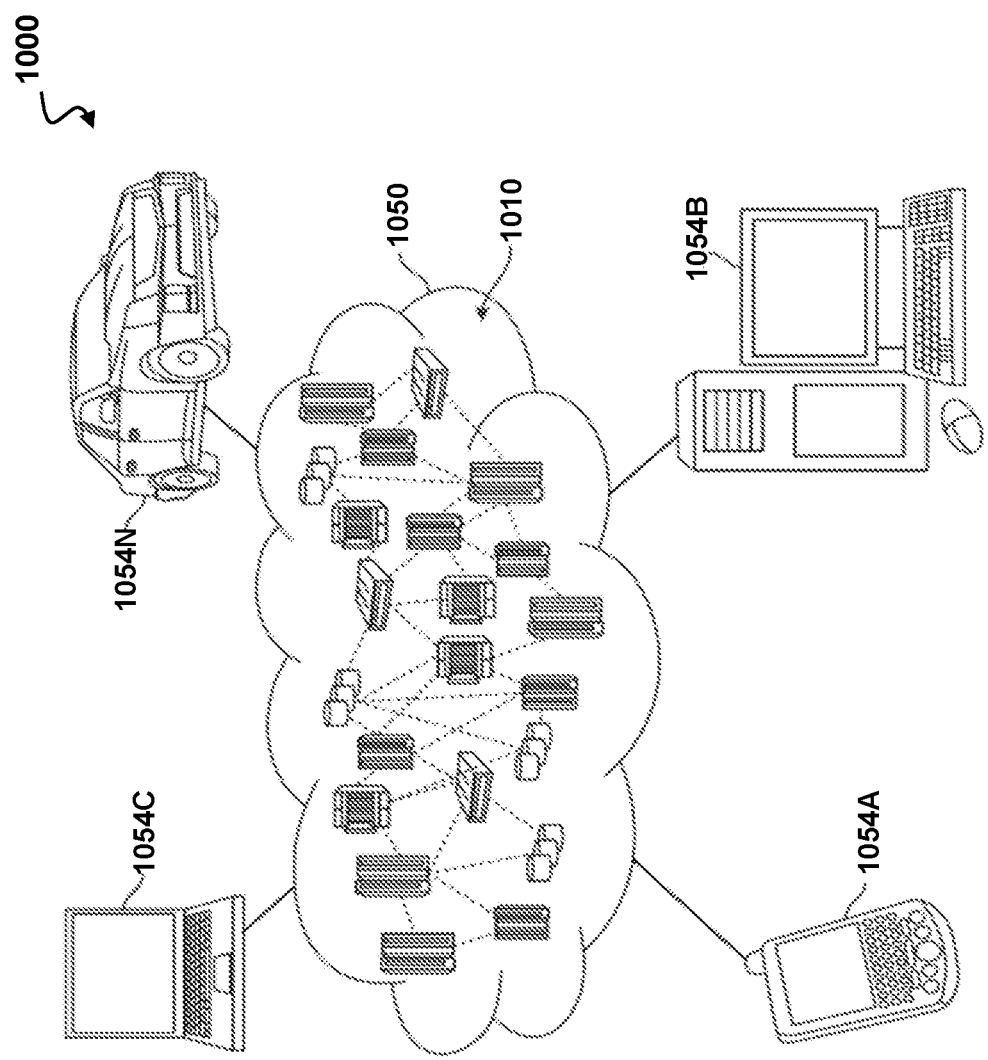
FIG. 10 is a cloud computing environment for a consumer-oriented behavior prediction and notification system in accordance with an embodiment of the invention.

With reference to FIG. 10, the present embodiments include an illustrative cloud computing environment 1000. As shown, many embodiments of cloud computing environment 1050 comprise one or more cloud computing nodes 1010 with which local computing devices used by cloud consumers, such as, for example, personal digital assistants (PDA), smartphones, smartwatches, set-top boxes, video game systems, tablet, mobile computing devices, or cellular telephones 1054A, desktop computers 1054B, laptop computers 54C, and/or automobile computer systems 1054N may communicate. In a number of embodiments, nodes 1010 may communicate with one another. In more embodiments, they may be grouped (not shown) physically or virtually, in one or more networks, such as, but not limited to, private, community, public, or hybrid clouds as described herein, or as a combination thereof. In certain embodiments, this can allow a cloud computing environment 1050 to offer infrastructure, platforms and/or software as services for which a cloud consumer does not need to maintain resources on a local computing device. It can be understood by those skilled in the art that the types of computing devices 1054A-N shown in FIG. 10 are intended to be illustrative only and that computing nodes 1010 and cloud computing environments 1050 may communicate with any type of computerized device over any type of network and/or network addressable connection (e.g., using a web browser).

Figure 11:
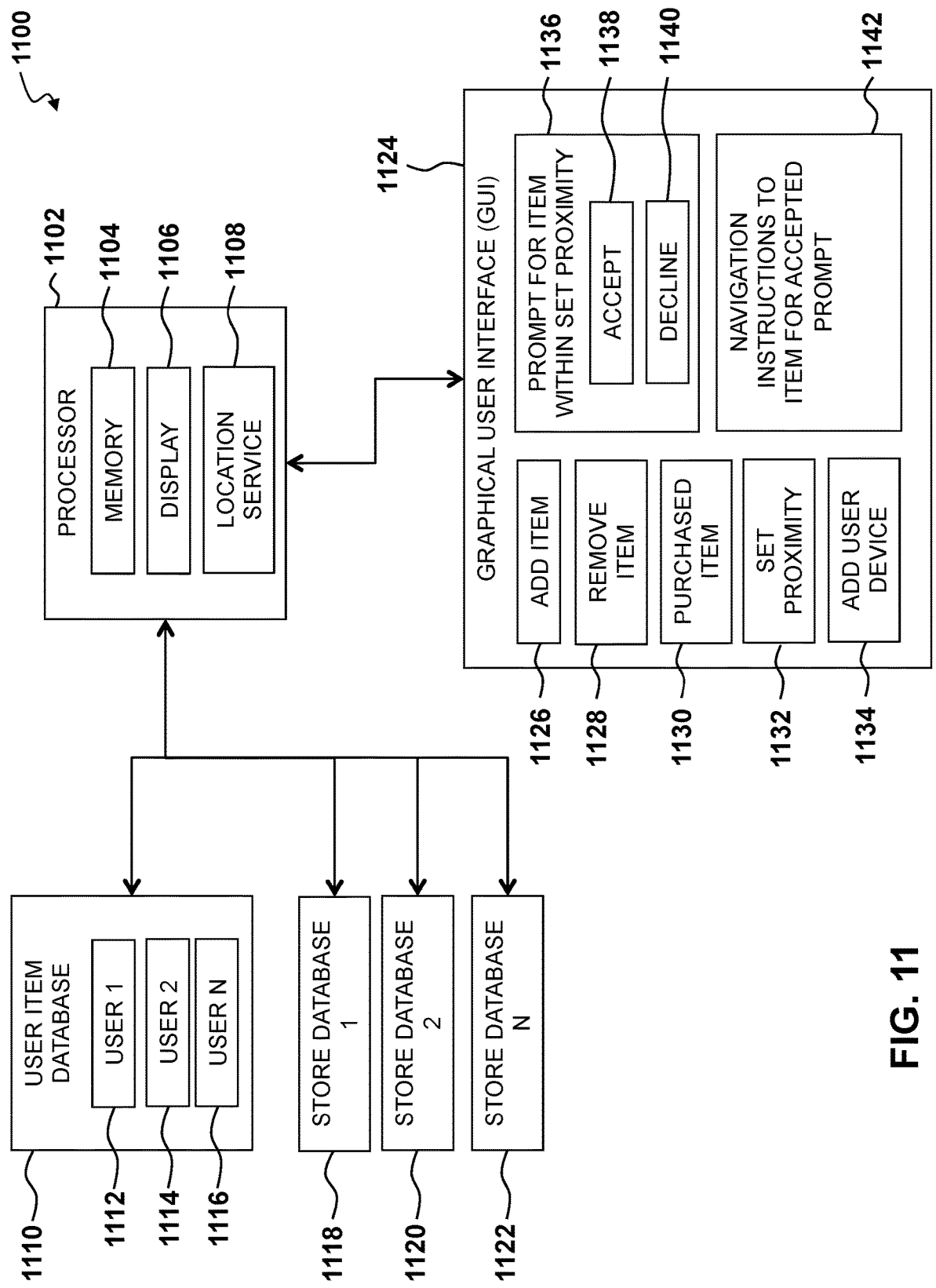
FIG. 11 depicts a high-level block diagram of a consumer-oriented behavior prediction and notification system in accordance with an embodiment of the invention.

FIG. 11 depicts a high-level block diagram of a consumer-oriented behavior prediction and notification system 1100 in accordance with an embodiment of the invention. The system 1100 may include a processor 1102 having addressable memory 1104. The processor 1102 may also be in communication with a display 1106, such as a display of a computer, smartphone, or the like. The processor 1102 may also be in communication with a location service 1108. In some embodiments, the location service 1108 may be a global positioning system (GPS), a cell tower triangulation, a wireless location service, or the like.

The processor 1102 may be in communication with one or more user item databases 1110. The user item database 1110 may store one or more user items for one or more users 1112, 1114, 1116. For example, a first user 1112 may select one or more items to be stored in the user item database 1110, and a second user 1114 may select one or more items to be stored in the user item database 1110. Each user item corresponds to each respective user 1112, 1114, 1116. In some embodiments, each user may have their items stored in a separate user item database 1110.

The processor 1102 may also be in communication with one or more store databases 1118, 1120, 1122. The store databases 1118, 1120, 1122 may include one or more of: item information, stock keeping unit (SKU), price, price history, similar items, inventory, predicted inventory, sales, or the like. In some embodiments the store databases may include an application programming interface (API) to access information on one or more items for that store. In other embodiments, the store databases 1118, 1120, 1122 may be third-party databases. In other embodiments, the store databases 1118, 1120, 1122 may include aggregated information from one or more sources. The store databases 1118, 1120, 1122 may include one or more stores associated with one or more stored items in the user item database 1110.

The processor 1102 may be in communication with a graphical user interface (GUI) 1124. The GUI 1124 may be enabled on a user device, such as a smartphone, wearable device, vehicle infotainment system, computer, or the like. The GUI 1124 may include options for a user to add an item 1126, remove an item 1128, and/or mark an item as purchased 1130. Adding an item 1126 may add the item to the user item database 1110 for the respective user 1112, 1114, 1116. The added item 1126 may be a physical item, a virtual item, and/or a service. For example, the added item 1126 may be a physical product, a software, an airline ticket, a car wash, or the like. The added item 1126 may be a specific item, such as a specific model of pen, or a general item, such as a black pen. The user may also remove an item 1128 via the GUI 1124. The user may remove the item 1128 if the user no longer needs the item, acquired the item, or the like. In some embodiments, the user may mark the item as purchased 1130. If an item is marked as purchased 1130, the system 1100 may track when and/or where the item was purchased and use this information for future prompts. For example, if a user purchases an airline ticket every three months, the system 1100 may send a prompt to the user to purchase another airline ticket based on past purchases and/or activity. In some embodiments, the user may interact with the GUI 1124 via touch, a controller, voice, or the like.

The GUI 1124 may also allow the user to set one or more preferences. For example, the user may set a proximity 1132. The set proximity 1132 may be a distance and/or time from a user to one or more stores associated with a stored item. For example, in a dense city a user may set a proximity as fifteen minutes whereas in a more rural setting a user may set a proximity as fifteen miles. The set proximity 1132 is the distance and/or time from a store associated with a stored item by the user before a prompt is provided. In some embodiments, a user may set an importance level for one or more items, which may extend the distance and/or time to receive a prompt. For example, if a user needs paper towels they may set a higher importance and the system 1100 may provide a prompt to the user when a store associated with the stored paper towels is nearby, even if that store is outside of the set proximity 1132. The user may also add one or more user devices 1134. User devices may include a smartphone, car tracking system, one or more wearables, or the like. These devices may provide an input to the location service 1108 in order to determine a location of the user for providing prompts.

The GUI 1124 may provide a prompt for a stored item within a set proximity 1136. The user may accept 1138 or decline 1140 this prompt. If the user accepts 1138 the prompt 1136, then the GUI may provide navigation instructions to the item 1142. If the user declines 1140 the prompt the system 1100 may wait until the prompt conditions arise again. In other embodiments, the system 1100 may provide a snooze for the prompt so as to prevent repeated prompts in succession when the prompt conditions are met. The navigation instructions 1142 may include directions to the store associated with the stored item. In other embodiments, the navigation instructions 1142 may include directions within the store, such as directing the user to the aisle containing the stored item. In some embodiments, the system 1100 may communicate with a store to have the associated item held for pickup, such as at a customer service counter. The user may then be directed to this location to pick up the item in person. In some embodiments, the GUI 1124 may display one or more offers for an item. In some embodiments, the one or more offers may be displayed prior to accepting 1138 a prompt. In other embodiments, the one or more offers may be displayed once the user is at the item and/or store to purchase the item.

In some embodiments, the stored item may not be physically present at the store, but may be ordered at the store. For example, a store may have a sale on a stored item, but the only way to order the item may be by going to the physical store and placing the order in person. Online ordering or online ordering at the sale price may not be available. In some embodiments, the system 1100 may notify the user, via the GUI 1124, if the stored item is physically available or needs to be ordered in the store. In some embodiments, the user may set a preference to only be provided a prompt 1136 for items that are physically available.

Figure 12:
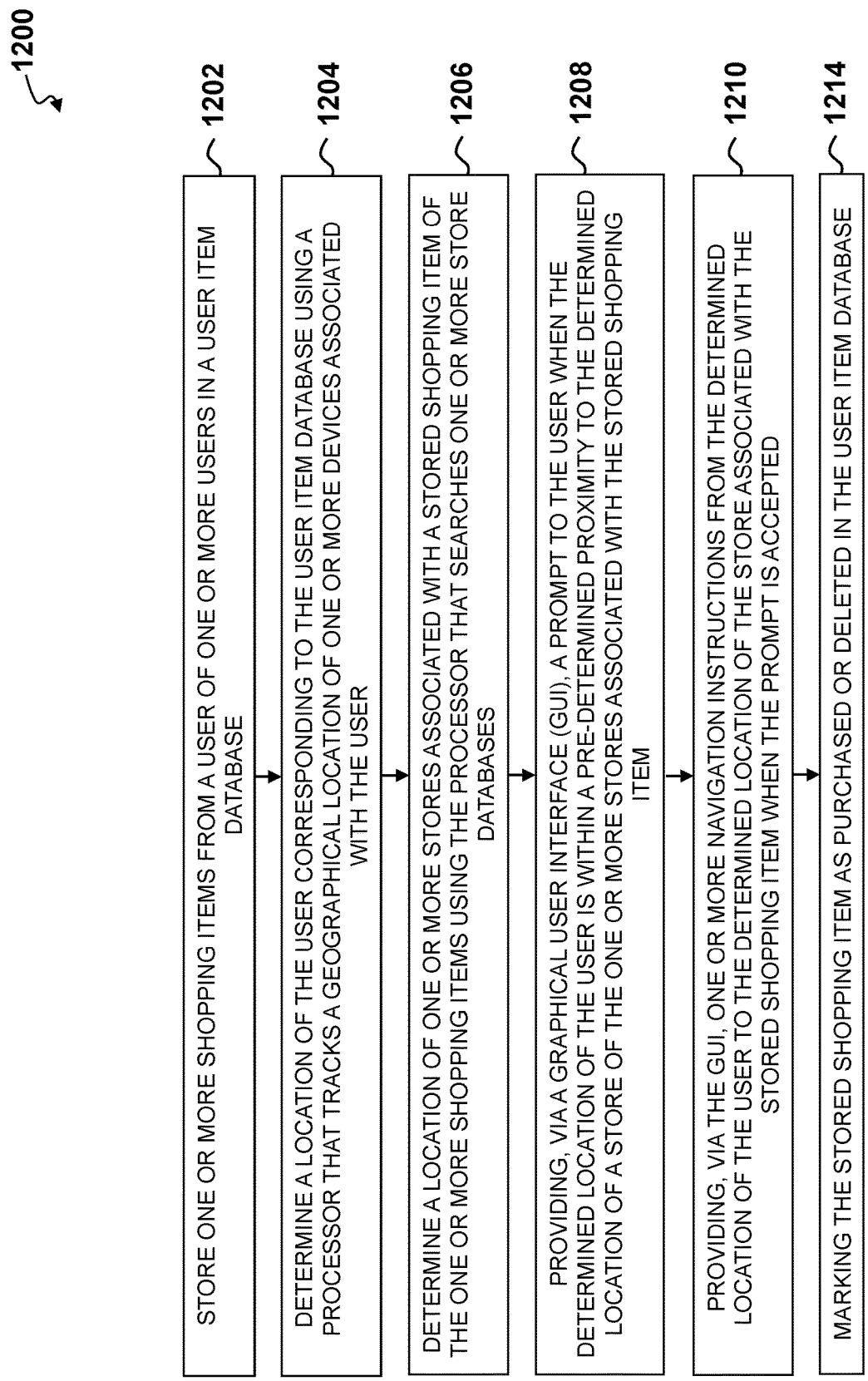
FIG. 12 depicts a high-level flowchart of a method embodiment of a consumer-oriented behavior prediction and notification system in accordance with an embodiment of the invention.

FIG. 12 depicts a high-level flowchart of a method embodiment 1200 of a consumer-oriented behavior prediction and notification system in accordance with an embodiment of the invention. The method 1200 may include storing one or more shopping items for a user of one or more users in a user item database (step 1202). The stored items may be received from one or more user devices. For example, a user may use their smartphone, computer, wearable, or other device to add a shopping item to be stored. In other embodiments, the stored items may be added based on one or more past purchases. For example, if a user purchases an airline flight every three months, the airline flight may be stored in the user item database. In some embodiments, the method 1200 may distinguish between items manually added by the user and items added based on past purchases.

The method 1200 may then include determining a location of the user corresponding to the user item database using a processor that tracks a geographical location of one or more devices associated with the user (step 1204). The location of the user may be a location of the user device, such as a smartphone, tablet, or the like. The location may also be determined by associated devices, such as a vehicle infotainment system, wearables, or the like.

The method 1200 may then determine a location of one or more stores associated with the stored shopping item of the one or more shopping items using the processor that searches one or more store databases (step 1206). Some stored shopping items may be associated with only one store, such as a specific brand carried exclusively by a physical stored. Other stored shopping items may be carried by two or more stores. In some embodiments, the method 1200 may include searching for similar or corresponding items at other stores. For example, if a user adds a specific pen brand to their shopping list the method 1200 may also include searching for corresponding pens having a similar rating, price point, and/or specification.

The method 1200 may then include providing, via a graphical user interface (GUI), a prompt to the user when the determined location of the user is within a pre-determined proximity to the determined location of the store of the one or more stores associated with the stored shopping item (step 1208). The store may have the physical item or the item may need to be ordered in the store itself. The pre-determined proximity may be set by the user. The pre-determined proximity may be a distance and/or time from the location of the user. The pre-determined proximity may be adjusted based on an importance of the item to the user.

The method 1200 may then include providing, via the GUI, one or more navigation instructions from the determined location of the user to the determined location of the store associated with the stored shopping item when the prompt is accepted (step 1210). In some embodiments, the method 1200 may provide navigation instructions from the current location to the physical location of the store. In other embodiments, the method 1200 may provide navigation instructions inside the store, such as by providing navigation to a specific aisle or area of the store containing the item. In embodiments where the item is not physically available, but must be ordered in the physical store, the navigation instructions may guide the user to a customer service counter or other location where the item may be ordered in the store.

The method 1200 may then include marking the stored shopping item as purchased or deleted in the user item database (step 1214). By marking the item as purchased, the method 1200 may store the purchase and use purchase patterns to add items in the future and/or provide additional prompts in the future. For example, if a user purchases paper towels every two weeks, the method 1200 may store paper towels every two weeks in the user item database.

In many embodiments, the data communication between the client user interfaces, cloud-based services, and/or provider content servers may be via, for example, a User Datagram Protocol (UDP) which is a transport layer protocol defined for use with the IP network layer protocol. In certain embodiments, a push data mechanism may be implemented via TCP/IP protocols and the line tracking time updates may be sent in real-time. Each mobile device may comprise an embedded web application server that may allow executable applications or scripts, e.g., application software that may be available in versions for different platforms and are to be executed on the mobile device. Applications may be developed to support various mobile devices and their respective operating systems such as: iOS, Android, and Windows.

In a number of embodiments, both service providers and users utilize a software application on a portable computing device which can transmit data, and associated information to the centralized server via, for example, wireless WiFi®, wireless local area network (WLAN), or other wireless networks with broadcast methods such as Long Term Evolution (LTE), Bluetooth, and/or any other hardware or software radio broadcast methods. The centralized server may connect and work with any such devices that may use LTE or WLAN, for example, mobile phones, specifically smartphones, personal computers, video game consoles, tablets, televisions, and/or digital cameras, to connect to a network resource such as the Internet via wired or wireless communication.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/ operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

The visual displays in the figures are generated by modules in local applications on computing devices and/or on the system/platform, and displayed on electronic displays of computing devices for user interaction and form graphical user interface for interaction with the system/platform disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
   storing one or more items from a user of one or more users in a user item database, wherein the user item database is associated with the user of one or more users;
   determining a location of the user corresponding to the user item database using a processor that tracks a geographical location of one or more devices associated with the user;
   determining a location of one or more stores associated with a stored item of the one or more items using the processor that searches one or more store databases, wherein each store database comprises a geographical location of each item;
   setting, via a graphical user interface (GUI), a proximity from the user to the one or more stores;
   receiving, via the GUI, an importance level for the one or more items;
   extending the set proximity based on the importance level for the one or more items; providing,
   via the GUI, a prompt to the user when the determined location of the user is within one or more of: the set proximity and the extended set proximity to the determined location of a store of the one or more stores associated with the stored item;
   receiving voice commands from the user for authentication and approval of a pre-payment for the stored item;
   waiting for prompt conditions when the prompt is declined, wherein the prompt conditions correspond to the determination that the user is within the set proximity and the extended set proximity to the determined location of the store associated with the stored item;
   providing a snooze for a prompt when the prompt conditions are met;
   providing, via the GUI, one or more offers for the stored item when the prompt is accepted, wherein the one or more offers are filtered down to a pre-determined number of offers;
   providing, via the GUI, one or more navigation instructions from the determined location of the user to the determined location of the store associated with the stored item when the prompt is accepted;
   providing, via the GUI, one or more navigation instructions inside the store associated with the stored item to the stored item;
   marking the stored item as purchased in the user item database; and
   storing the purchased item in the user item database.

2. The method of claim 1 further comprising:
   marking the stored item as completed in the user item database.

3. The method of claim 1, further comprising:
   receiving external information from one or more external sensors.

4. The method of claim 3, wherein scheduling the items for the future is further based on the received external information.

5. The method of claim 1 wherein each store database further comprises a price of each item.

6. The method of claim 1 further comprising:
   providing, via the GUI, one or more navigation instructions inside the store associated with the stored item to the stored item when the prompt is accepted.

7. The method of claim 1 further comprising:
   setting, via the GUI, the pre-determined proximity based on a distance from the geographical location of one or more devices associated with the user and a time from the geographical location of one or more devices associated with the user.

8. The method of claim 1 wherein the stored item is a physical item available at the store of the one or more stores associated with the stored item.

9. The method of claim 1 wherein the stored item is an item available to order at the store of the one or more stores associated with the stored item.

10. The method of claim 1 further comprising:
removing one or more items from the user of one or more users in the user item database.

11. The method of claim 1, wherein the one or more items comprise at least one shopping item and at least one service.

12. A system comprising:
a user item database, wherein the user item database is associated with a user of one or more users, and wherein one or more shopping items from the user of one or more users is stored in the user item database;
one or more store databases, wherein each store database comprises a geographical location of each shopping item;
a processor having addressable memory, the processor configured to:
determine a location of the user corresponding to the user item database by tracking a geographical location of one or more devices associated with the user;
determine a location of one or more stores associated with a stored shopping item of the one or more shopping items by searching the one or more store databases;
set, via a graphical user interface (GUI), a proximity from the user to the one or more stores;
receive, via the GUI, an importance level for the one or more items;
extend the set proximity based on the importance level for the one or more items;
provide, via the GUI, a prompt to the user when the determined location of the user is within one or more of: the set proximity and the extended set proximity to the determined location of a store of the one or more stores associated with the stored shopping item, wherein the set proximity is based on a distance from the geographical location of one or more devices associated with the user and a time from the geographical location of one or more devices associated with the user;
receive voice commands from the user for authentication and approval of a pre-payment for the stored shopping item;
wait for prompt conditions when the prompt is declined, wherein the prompt conditions correspond to the determination that the user is within the set proximity and the extended set proximity to the determined location of the store associated with the stored shopping item;
provide a snooze for a prompt when the prompt conditions are met;
provide, via the GUI, one or more offers for the stored shopping item when the prompt is accepted, wherein the one or more offers are filtered down to a pre-determined number of offers;
provide, via the GUI, one or more navigation instructions from the determined location of the user to the determined location of the store associated with the stored shopping item when the prompt is accepted;
provide, via the GUI, one or more navigation instructions inside the store associated with the stored shopping item to the stored shopping item;
mark the stored shopping item as purchased in the user item database; and
store the purchased item in the user item database.

13. The system of claim 12 wherein the stored shopping item is a physical item available at the store of the one or more stores associated with the stored shopping item.

14. The system of claim 12 wherein the processor is further configured to:
provide, via the GUI, one or more navigation instructions inside the store associated with the stored shopping item to the stored shopping item when the prompt is accepted.

15. The system of claim 12 wherein the stored shopping item is an item available to order at the store of the one or more stores associated with the stored shopping item.

16. The system of claim 12 wherein the processor is further configured to:
provide, via the GUI, one or more offers for the stored shopping item when the prompt is accepted; and
filter the one or more offers down to a pre-determined number of offers.

17. A system comprising:
a processor having addressable memory, the processor configured to:
store one or more items from a user of one or more users in a user item database, wherein the user item database is associated with the user of one or more users;
determine a location of the user corresponding to a user item database by tracking a geographical location of one or more devices associated with the user;
determine a location of one or more stores associated with a stored item of the one or more items by searching the one or more store databases, wherein each store database comprises a geographical location of each item;
set, via a graphical user interface (GUI), a proximity from the user to the one or more stores;
receive, via the GUI, an importance level for the one or more items;
extend the set proximity based on the importance level for the one or more items;
provide, via the GUI, a prompt to the user when the determined location of the user is within one or more of: the set proximity and the extended set proximity to the determined location of a store of the one or more stores associated with the stored item;
receive voice commands from the user for authentication and approval of a pre-payment for the stored item;
wait for prompt conditions when the prompt is declined, wherein the prompt conditions correspond to the determination that the user is within the set proximity and the extended set proximity to the determined location of the store associated with the stored item;
provide a snooze for a prompt when the prompt conditions are met;
provide, via the GUI, one or more offers for the stored item when the prompt is accepted, wherein the one or more offers are filtered down to a pre-determined number of offers;
provide, via the GUI, one or more navigation instructions from the determined location of the user to the determined location of the store associated with the stored item when the prompt is accepted;
provide, via the GUI, one or more navigation instructions inside the store associated with the stored item to the stored item;

mark the stored item as purchased in the user item database; and store the purchased item in the user item database.

\* \* \* \* \*